(12) United States Patent
Kundig et al.

(10) Patent No.: US 12,488,208 B2
(45) Date of Patent: Dec. 2, 2025

(54) SECURE ID SCANNING USING IMAGE ANALYSIS

(71) Applicant: Scandit AG, Zurich (CH)

(72) Inventors: Christian Kundig, Zurich (CH); Oliver Akermann, Zurich (CH); Sebastien Roch, Zurich (CH)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/984,596

(22) Filed: Dec. 17, 2024

(65) Prior Publication Data
US 2025/0356150 A1 Nov. 20, 2025

Related U.S. Application Data

(60) Provisional application No. 63/648,529, filed on May 16, 2024.

(51) Int. Cl.
*G06K 7/10* (2006.01)
*G06K 7/14* (2006.01)

(52) U.S. Cl.
CPC ....... *G06K 7/1413* (2013.01); *G06K 7/10722* (2013.01)

(58) Field of Classification Search
CPC .................................................. G06K 7/10722
USPC .................................................... 235/462.41
See application file for complete search history.

(56) References Cited

U.S. PATENT DOCUMENTS

| | | | |
|---|---|---|---|
| 5,308,966 A | 5/1994 | Danielson et al. | |
| 5,510,604 A | 4/1996 | England | |
| 6,082,619 A | 7/2000 | Ma et al. | |
| 7,121,469 B2 | 10/2006 | Dorai et al. | |
| 7,159,780 B2 | 1/2007 | Christian | |
| 7,416,125 B2 | 8/2008 | Wang et al. | |
| 7,606,741 B2 | 10/2009 | King et al. | |
| 2002/0023958 A1 | 2/2002 | He et al. | |
| 2006/0061806 A1 | 3/2006 | King et al. | |
| 2009/0224050 A1 | 9/2009 | Hayakawa et al. | |
| 2010/0187311 A1 | 7/2010 | van der Merwe et al. | |
| 2014/0310185 A1* | 10/2014 | Staflin | G06Q 20/3227 705/71 |
| 2022/0116230 A1* | 4/2022 | Dietrich | H04L 9/006 |

FOREIGN PATENT DOCUMENTS

WO 2007038680 A2 4/2007

* cited by examiner

*Primary Examiner* — Toan C Ly
(74) *Attorney, Agent, or Firm* — Kilpatrick Townsend & Stockton LLP

(57) ABSTRACT

A method for decoding an optical pattern includes transmitting instructions for a first device to provide a link and an encryption key to a second device. The link includes a URL and a session ID that the first device has with a website. The method includes receiving a web request made by the second device using the URL. The method includes transmitting decoding software to the second device for decoding fields of a document based on image analysis of an image acquired by the second device. The method includes receiving decoded data from the second device. The method includes transmitting the decoded data to the website through a server in which the server uses only volatile memory to store the decoded data.

20 Claims, 9 Drawing Sheets

SECURE ID SCANNING USING IMAGE ANALYSIS

CROSS-REFERENCE TO RELATED APPLICATIONS

This application claims priority to U.S. Provisional Application No. 63/648,529, filed on May 16, 2024, the disclosure of which is incorporated by reference in its entirety for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

The techniques described herein pertain to secure ID scanning using image analysis. In some implementations, an easy-to-integrate ("low-code") ID scanning solution can be provided for networks and can provide scanning workflows with an excellent user experience and advanced features such as a secure handover from desktop to mobile or other devices. A server system can be used to perform the secure handover and other suitable operations described herein. The techniques described herein can be built and/or hosted as a cloud service, further minimizing integration efforts for end users. The techniques can be implemented in a way in which the hosting provider does not see, or otherwise does not have durable access to, the private information from an ID scan and can take special measures to prevent access to the private information by the hosting provider.

In certain embodiments, a system for decoding an optical pattern using a digital camera comprises: a first device, wherein: the first device is a personal computer; and the personal computer is a laptop or desktop; a second device, wherein: the second device is a mobile device; the mobile device is a tablet or smartphone; and the second device comprises a camera; and one or more memory devices comprising instructions that, when executed by one or more processors, perform the following steps: transmitting, to the first device, instructions for the first device to provide a link and an encryption key to the second device, wherein: the link comprises a Uniform Resource Locator (URL); the link comprises a session ID that the first device has with a website of a service provider; and the encryption key is generated by the first device; receiving a web request made by the second device using the URL; transmitting decoding software to the second device for decoding one or more fields of a document based on image analysis of an image acquired by the camera of the second device; receiving decoded data from the second device, the decoded data comprising personally identifiable information; and transmitting the decoded data to the website through a server, wherein the server uses only volatile memory to store the decoded data.

In certain embodiments, a method for decoding an optical pattern comprises: transmitting, to a first device, instructions for the first device to provide a link and an encryption key to a second device, wherein: the link comprises a Uniform Resource Locator (URL); the link comprises a session ID that the first device has with a website of a service provider; and the encryption key is generated by the first device; receiving a web request made by the second device using the URL; transmitting decoding software to the second device for decoding one or more fields of a document based on image analysis of an image acquired by a camera of the second device; receiving decoded data from the second device, the decoded data comprising personally identifiable information; and transmitting the decoded data to the website through a server, wherein the server uses only volatile memory to store the decoded data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
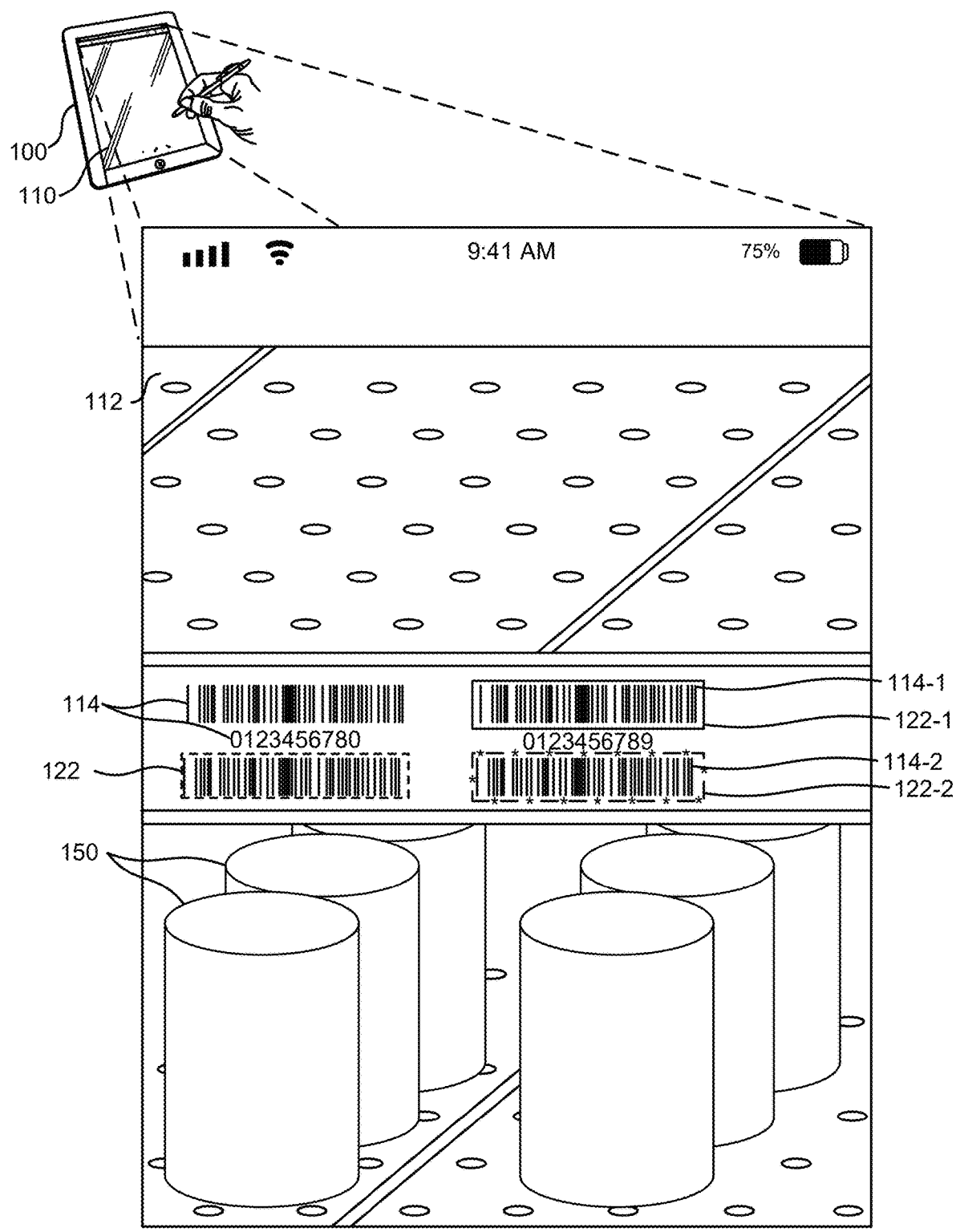
FIG. 1 depicts an example technique for automated recognition and decoding of a pattern in an image containing multiple patterns, in accordance with some embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The techniques described herein pertain to secure ID scanning using image analysis. In some implementations, an easy-to-integrate ("low-code") ID scanning solution can be provided for networks and can provide scanning workflows with an excellent user experience and advanced features such as a secure handover from desktop to mobile or other devices. A server system can be used to perform the secure handover and other suitable operations described herein. The techniques described herein can be built and/or hosted as a cloud service, further minimizing integration efforts for end users. The techniques can be implemented in a way in which the hosting provider does not see, or otherwise does not have durable access to, the private information from an ID scan and can take special measures to prevent access to the private information by the hosting provider.

In some implementations, a server system, or other suitable system, can include (i) an on-device computer vision and/or machine-learning model to extract ID data from a document, (ii) separation of concerns on a backend so systems processing data extracted from ID documents can be run on volatile memory without permanent storage while being available to authorized users, and/or (iii) end-to-end encryption of data passing through a system of the hosting provider to ensure that data is not able to be read by the hosting provider, even in memory. The server system can include multiple servers that can allow communication between different devices. For example, the server system can include a first server that can facilitate communication between a user device and a client device, a second server that can facilitate communication between the server system and the client device and/or the user device. The server system may include other servers for facilitating other types or permutations of communication.

In some embodiments, the disclosed techniques can provide on-device processing that can facilitate a faster scanning experience by not requiring manual image capture or latency from uploading images. This can ensure a frictionless user experience and higher engagement in the self-service offering developed by the client. For example, the operations performed by the server system can allow a client device to offer document scanning services to a user without needing to gather personal data via image capture of a document. In a particular example, and instead of the client capturing image data that then needs to be analyzed, the server system can provide instructions to a user device to cause the user device to capture an image and to analyze image data of the image. A result of the analysis can be provided to the client to facilitate an interaction between the user and the client.

In a particular example, a user can visit a website provided or otherwise hosted by a client. The website may be configured to facilitate an interaction between the user and the client. In some embodiments, the interaction between the client and the user can include an account creation, a real-world service (e.g., a travel itinerary), or other suitable types of interactions. The interaction may require personal information or private information. For example, the interaction may request a scan of a personal identification card such as a driver's license, a passport, etc. Gathering image data by taking a picture of the personal identification card may involve risk. For example, gathering image data of the personal identification card and storing it in non-volatile memory may increase a risk of personal information from the personal identification card being unintentionally disclosed, for example via hacking or other malicious actions. To address this risk, such as by mitigating or eliminating the risk, the server system can be used. The user can interact with a feature of the website to cause the server system to provide a second website within the website. The second website can be provided as a website-within-a-website in which some portions of the website may still be visible (but possibly grayed out or blurred), but the second website may be clear and/or more prominent than the website. The second website may provide an option to scan a document. For example, the option can include selection of a device to perform the scanning. In some examples, the user can select a first option to use the user device displaying the second website to perform the scanning. In other examples, the user can select a second option to use a separate user device from the user device to perform the scanning. In the latter example, an optical pattern, such as a QR code or a barcode, can be displayed to be scanned by the separate user device for scanning the document.

The optical pattern, when scanned by the separate user device, can cause the server system to transmit instructions to the separate user device that, when executed by the user device, can cause the separate user device to perform certain processing operations. For example, the instructions may cause the separate user device to open an image capture program to scan the document. Additionally or alternatively, the instructions may cause the separate user device to analyze the scanned image of the document. In some examples, the analysis performed by the separate user device can include extracting personal or otherwise private information such as a name, a date of birth, an address, an identification number, and/or any other suitable personal or otherwise private information. The instructions may also configure the separate computing device to transmit results of the analysis directly to the website. Directly transmitting the results of the analysis to the website may involve transmitting the results to the website without storing the results in non-volatile memory of the server system. That is, while the server system may facilitate communication between the separate user device and the website, the server system may not store the results or other personal or private information in non-volatile memory. The results transmitted to the website may be used to complete, or initiate, the interaction between the user and the client.

As described above, and by focusing on lightweight data capture, storage of PII, such as the personal or otherwise private information, may not be required to facilitate the interaction. Even for the device handover, the communication between both devices is end-to-end (E2E) encrypted, ensuring that PII cannot be accessed during the transfer, which addresses data privacy concerns for the client and/or the user. Also, the disclosed techniques provide a pre-built ID scanning workflow that can easily be inserted into an existing website with just a few lines of code.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

Figure 2:
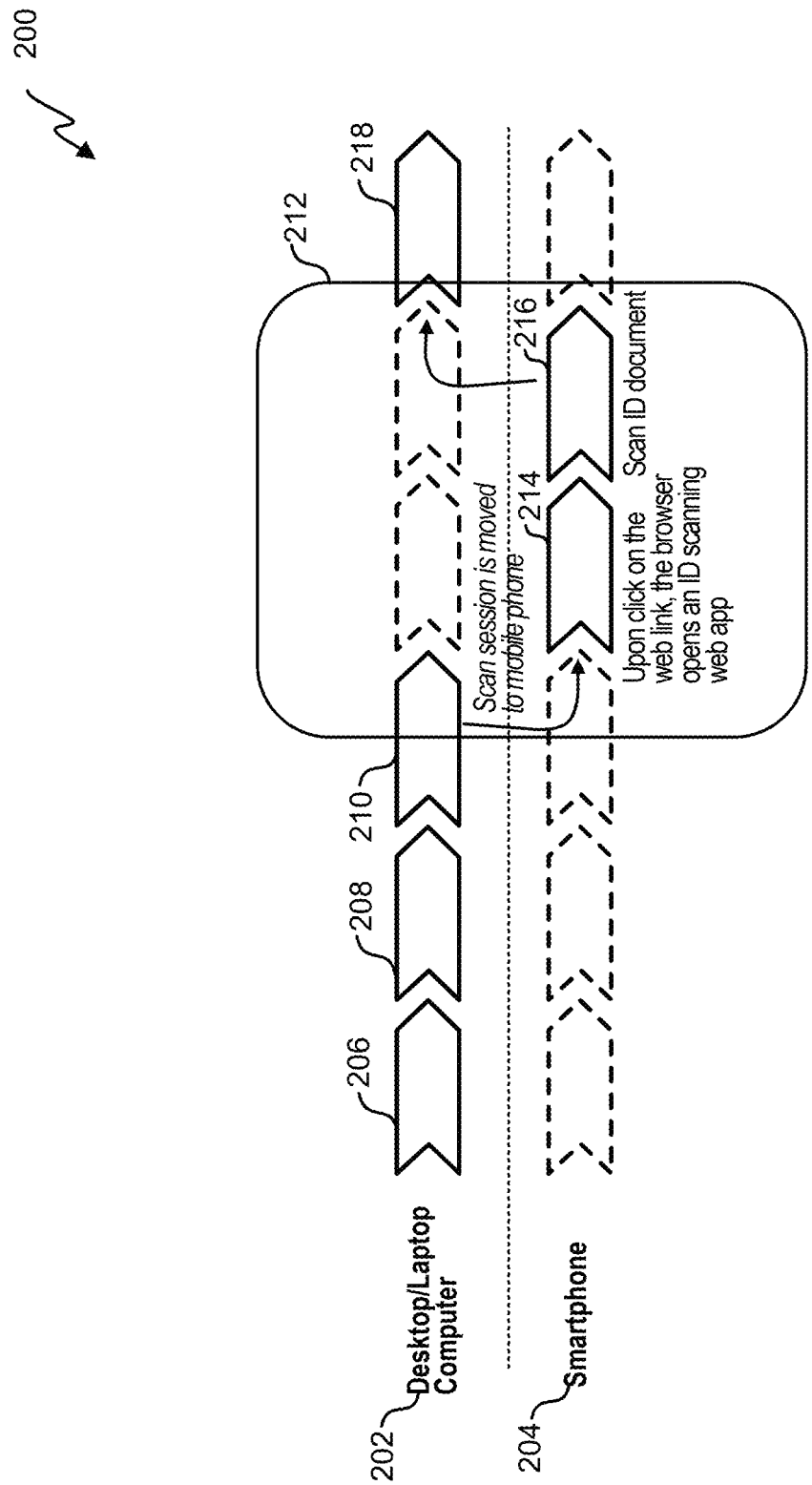
FIG. 2 depicts an embodiment of a workflow for an end-to-end device handover that can include secure ID scanning, in accordance with some embodiments.

FIG. 2 depicts an embodiment of a workflow 200 for an end-to-end device handover that can include secure ID scanning, in accordance with some embodiments. As illustrated in FIG. 2, the workflow 200 can involve a first device 202 and a second device 204. The first device 202 may be or include a personal computer such as a laptop or a desktop. Additionally or alternatively, the second device 204 may be or include a mobile device such as a tablet or a smartphone. In some examples, the first device 202 and/or the second device 204 can include a camera. The workflow 200 can proceed with operation 206, operation 208, and operation 210, which each may be performed in series with respect to one another. At the operation 206, the first device 202 may be used to access a website. In some examples, the website may be provided and/or hosted by a client that is configured to provide a product and/or a service. Accessing the website may include using the first device 202 to access the Internet or other suitable network and using the first device 202 to navigate through the Internet or other suitable network to access data available via the website. At the operation 208, the first device 202 can be used to select a first product or service from the website. For example, the first device 202 can be used, such as via a computer mouse or a keyboard, to indicate that the user wants to acquire the first product or service from the client. At the operation 210, the first device 202 is used to initiate a device handover process 212. For example, the first device 202 can be used to select an option on the website for scanning a document to facilitate an interaction between the user and the client to provide the product and/or service to the user on behalf of the client.

The device handover process 212 can involve operation 214 and operation 216, though any other suitable number and/or types of operations are possible for the device handover process 212. The operation 214 can involve the first device 202 receiving instructions for the first device 202 to provide a link and an encryption key to the second device 204. In some examples, the link can include a Uniform Resource Locator (URL), the link can include a session ID that the first device 202 has with the website, and the encryption key can be generated by the first device 202. Additionally or alternatively, the operation 214 can involve the second device 204 can make a web request using the URL. Additionally or alternatively, the operation 214 can involve the second device 204 receiving decoding software for decoding one or more fields of the document based on image analysis of an image acquired by the camera of the second device 204. The operation 216 can involve the second device 204 transmitting decoded data that can include personally identifiable information. In some examples, the second device 204 can transmit the decoded data to the website through a server using only volatile memory of the server for storing the decoded data. At operation 218, the first device 202 completes or otherwise causes to be initiated the interaction between the user and the client based on the decoded data provided to the website.

Figure 3:
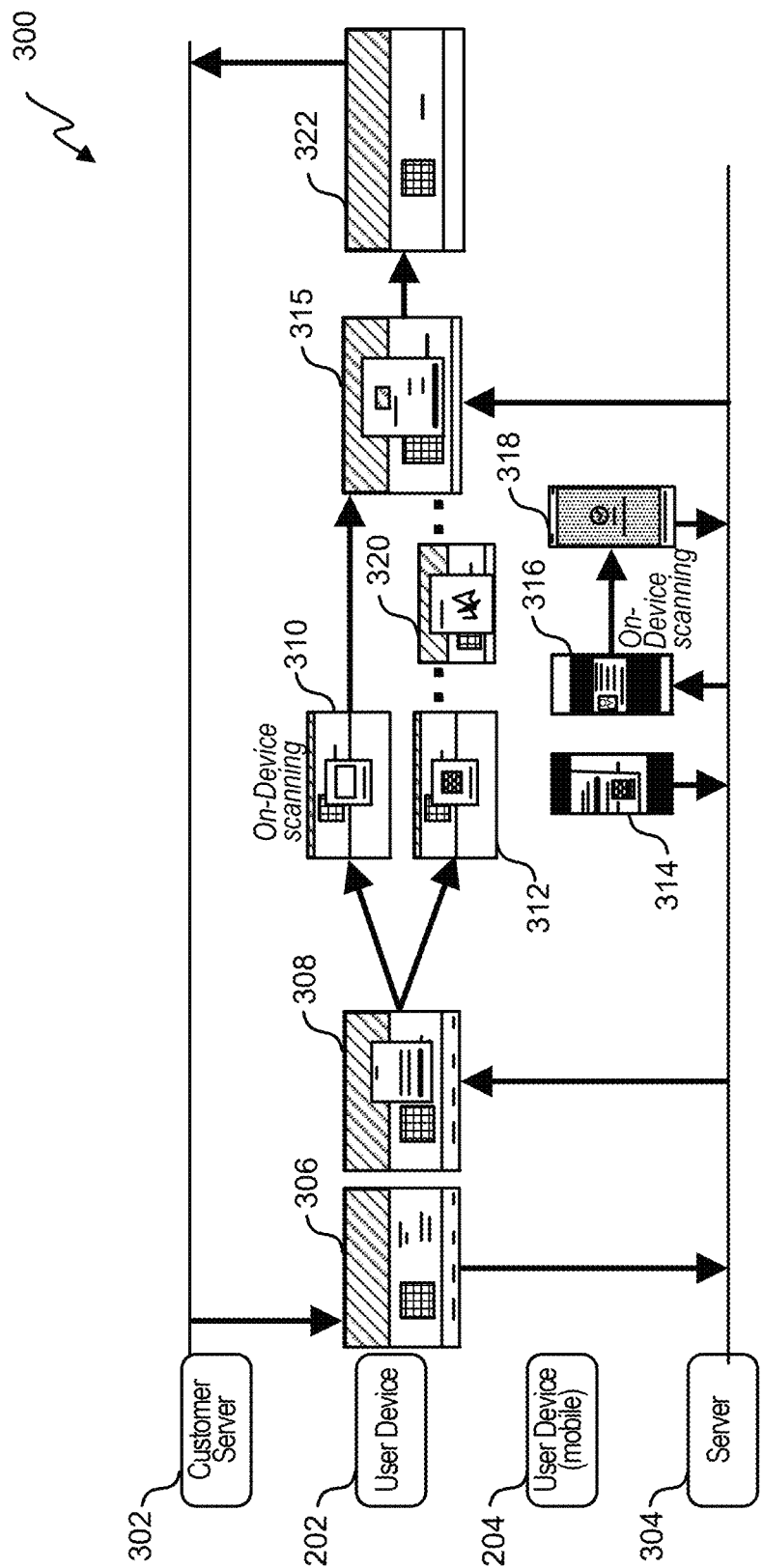
FIG. 3 depicts an embodiment of a data flow diagram for secure ID scanning using image analysis, in accordance with some embodiments.

FIG. 3 depicts an embodiment of a data flow diagram 300 for secure ID scanning using image analysis, in accordance with some embodiments. As illustrated in FIG. 3, the data flow diagram 300 can include operations that involve the first device 202, the second device 204, a client server 302, and a server system 304. The data flow diagram 300 may begin with operation 306 at which the first device 202 is used to access a website. The first device 202 can transmit, such as via a network such as the Internet, data to the client server 302 to cause the client server 302 to provide access to the website to the first device 202. The first device 202 can be used to interact with the website to request a product, a service, and/or resources from the client associated with the client server 302. The interaction between the first device 202 and the website can cause the website to interact with the server system 304. For example, the website can make a call to the server system 304 to cause a second website to be provided within the website at operation 308.

The second website may include an interactive feature that can allow a user of the first device 202 to decide whether to perform a scanning operation using the first device 202 or the second device 204. Selecting a first option of the interactive feature can cause the data flow of the data flow diagram 300 to proceed with operation 310, which involves using the first device 202 to capture image data. The first device 202 can be used, such as via a camera of the first device 202, to capture an image of the document. The server system 304 may transmit decoding instructions to the first device 202 to decode image data captured via the camera capturing the image. The results of the decoding performed by the first device 202 can be transmitted, such as at operation 315, to the website for use in completing, initiating, or otherwise facilitating the interaction between the user and the client.

Selecting a second option of the interactive feature of the second website can cause the data flow of the data flow diagram 300 to proceed with operation 312, which involves using the second device 204 to capture image data. The second device 204 can be used, such as via a camera of the second device 204, to capture an image of the document. At operation 314, the server system 304 can cause an optical pattern, such as a QR code or a barcode, to appear on a display device of the first device 202. The second device 204 can be used to scan, such as at operation 316, the optical pattern, and scanning the optical pattern can cause the server system 304 to transmit instructions to the second device 204. The instructions can include decoding instructions for decoding information from image data. For example, and at operation 318, the second device 204 can be used to capture an image of the document, and the second device 204 can execute the instructions to decode image data of the image to extract information from the document. The second device 204, such as during the operation 318, can transmit the decoded data to the server system 304, which may only store the decoded data via volatile memory that may not be accessible, or that may otherwise be deleted, after completion of the operations described with respect to FIG. 3. The server system 304 may transmit the decoded data, or may facilitate transmission of the decoded data, to the website via the operation 315. That is, the decoded results may be encrypted by the server system 304, or by the second device 204, and transmitted to the website. In some examples, while the second device 204 is capturing the image data and/or otherwise performing processing on the image data, the first device 202 may display a notification 320 that informs the user that the second device 204 is connected with the server system 304 and/or is performing processing. At operation 322, the website uploads or otherwise transmits the decoded information to the client server 302 to facilitate the interaction between the user and the client. In some examples, the server system 304, or the second device 204, may transmit decryption instructions to the website to allow the website to decrypt the decoded information or to allow the website to transmit the decryption instructions to the client server 302.

Figure 4:
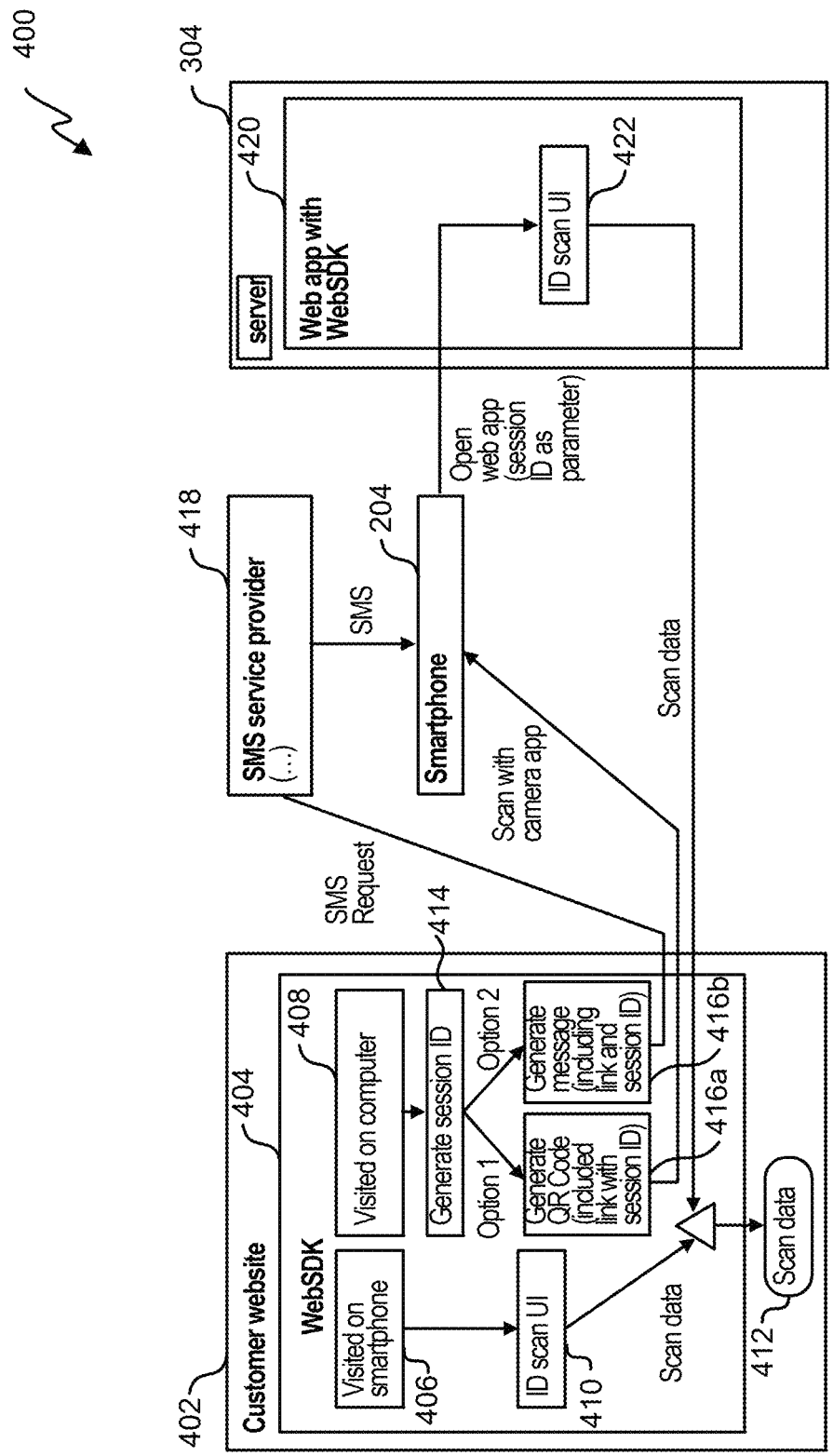
FIG. 4 depicts a diagram of an embodiment of a device handover that can be used for secure ID scanning using image analysis, in accordance with some embodiments.

FIG. 4 depicts a diagram of an embodiment of a device handover flow 400 that can be used for secure ID scanning using image analysis, in accordance with some embodiments. As illustrated in FIG. 4, the device handover flow 400 can involve a client website 402, the second device 204, and the server system 304, though the device handover flow 400 can involve any additional, alternative, or fewer components. The device handover flow 400 can begin with the client website 402. A user device, such as the first device 202 and/or the second device 204, can be used to access the client website 402. The client website 402 may include a web software development kit (WebSDK) 404 that can be used to control a procession of the device handover flow 400. The WebSDK 404 can include different process flows for performing the device handover flow 400, for example based on a method in which the client website 402 is accessed. In some examples, the WebSDK 404 may be provided to the client website 402 via the server system 304. If operation 406 is performed, then a first process flow may be initiated, and if operation 408 is performed, then a second process flow may be initiated. The operation 406 may involve the client website 402 being accessed by a mobile computing device such as the second device 204. In such examples, a device handover may not need to be performed or may otherwise be simplified compared with other device handover workflows. For example, and in response to the WebSDK 404 determining that the client website 402 is accessed by the mobile computing device, operation 410 can be performed in which a user interface for scanning a document can be displayed on the mobile computing device. The user interface may also cause the camera of the mobile computing device to be activated and ready to capture a scan or other suitable image data of the document. The mobile computing device can scan the document at operation 412, and the mobile computing device can analyze the captured image data to extract information from the document for sending to the client website 402 or to a server associated therewith.

In some examples, the operation 408 may involve the client website 402 being accessed by a personal computing device such as the first device 202. In such examples, the personal computing device may be different from the mobile computing device and may not have a camera at all, or may otherwise include a camera that is insufficient for scanning the document at an adequate level of quality to facilitate extraction of data from the document. The server system 304 can cause the client website 402 to present an option to a user of the personal computing device, which, when selected, can cause the second process flow to be initiated. The second process flow can begin with operation 414 in which the WebSDK 404, or other suitable component or service, generates a session ID. Additionally or alternatively, an optical pattern can be generated and displayed on the personal computing device via the client website 402. That is, the server system 304 can provide instructions to the client website 402, such as via the WebSDK 404, to provide the optical pattern via the client website 402. In some examples, the optical pattern can be provided via operation 416a, or an authentication message can be provided via operation 416b.

The operation 416a can involve generating the optical pattern and providing the optical pattern, as described above, via the client website 402 or a window therein. The operation 416b can involve generating an authentication message and transmitting the authentication message to the second device 204. In some examples, the WebSDK 404 can be used to generate the authentication message, and the authentication message can include the session ID and a link to provide instructions to the second device 204. The authentication message, or instructions to generate the authentication message, can be transmitted to an SMS service provider 418 that can transmit the authentication message to the second device 204. The second device 204 can be used to scan the QR code (e.g., after the operation 416a is performed) or to invoke the link (e.g., after the operation 416b is performed). In either case, after scanning the QR code or invoking the link, the second device 204 may at least indirectly communicatively couple with the server system 304, which may include WebSDK 420. The QR code and/or the link can cause the server system 304 to provide instructions to the second device 204. In some examples, the instructions can include decoding instructions for decoding information from image data captured by the second device 204. The instructions may also cause a user interface to be displayed on the second device 204 in which the user interface activates the camera of the second device 204 to allow the camera to capture image data of the document. For example, at operation 422, the second device 204 can be used to capture image data relating to the document. Capturing image data relating to the document can include taking a picture of the document using the camera of the second device 204.

The captured image data can be decoded, such as via the decoding instructions provided to the second device 204, by the second device 204, and the decoded data can be transmitted to the client website 402. In some examples, decoding the image data can include using machine-learning techniques to extract information from the image data. The information extracted from the image data can include personal information indicated by the document, and the personal information may, in some examples, include a name, an address, an identification number, a date of birth, etc. The extracted information can be encrypted and transmitted to the client website 402. In some examples, the encrypted information may only be stored at the client server 302 on volatile memory or may otherwise not be decryptable by the client server 302.

In some implementations, private data can be protected as described above. With respect to ID scanning, the processing happens on-device and/or in the client website 402, and as such, data is shared between the client website 402 and the second device 204 without the server system 304 seeing the data. With respect to device handover, if a desktop user is scanning from a mobile device, the hosting provider can manage this flow of data. To make sure this is secure and private, end-to-end encryption (E2EE) is included. E2EE can include a type of messaging that keeps messages private from everyone, including the messaging service.

Figure 5:
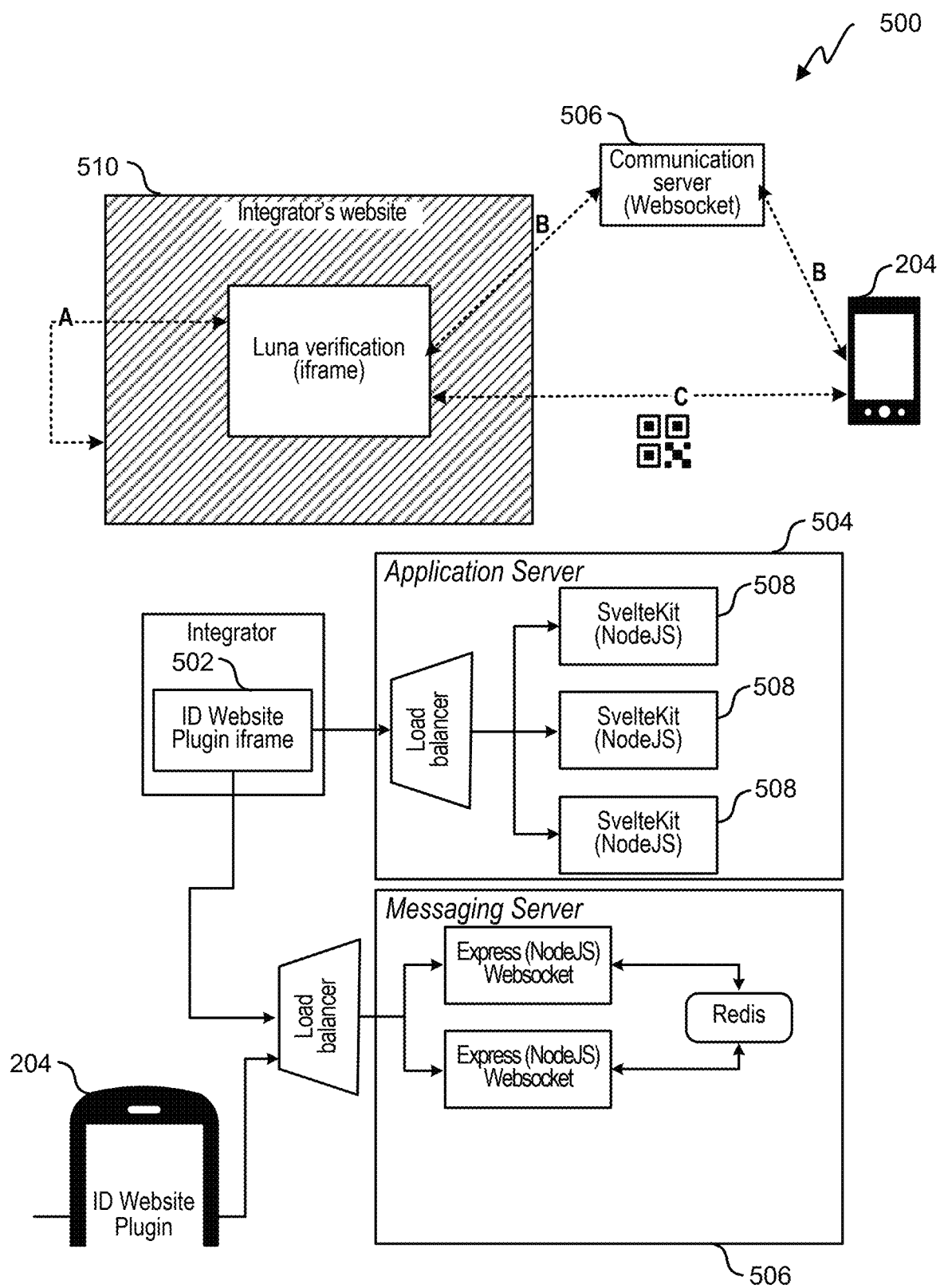
FIG. 5 depicts a simplified diagram of a computing environment that includes a server system that can facilitate secure ID scanning, in accordance with some embodiments.

FIG. 5 is a simplified diagram of a computing environment 500 that includes a server system 304 that can facilitate secure ID scanning as described herein. As illustrated in FIG. 5, the computing environment 500 can include client components and server components. The client components can include a web app 502, which can be or include a page or UI that is loaded in the user's browser and served by the application server 504. The web app 502 may include code to recognize whether the web app 502 is running on a personal computing device, such as desktop or a laptop (e.g., the first device 202), or running on a mobile computing device such as a smartphone and/or the second device 204. In response to detecting that the web app 502 is running on a mobile computing device, a detection is made to determine whether the web app 502 is running in a standalone (the user is running the whole process on mobile) or a handover (the scanner has been initiated from desktop) scenario. In response to detecting that the web app 502 is running on a personal computing device, the web app 502 can support running in a standalone scenario or can be used to initiate a device handover to the mobile computing device. The client component may also include a scanning WebSDK, such as the WebSDK 404, that can be embedded in the web app 502 and that can access the camera image and run the computer vision and/or machine-learning algorithms to extract the ID data. The web app 502, or the WebSDK, can support scanning documents via barcode, OCR MRZ (machine readable zone), OCR of VIZ (Visual inspection zone with portrait picture, such as on top of the MRZ in passports/VISA or the front of the card in Driver licenses, IDs, etc.).

The server components include the application server 504 and a messaging server 506. The application server 504 can serve the website, such as via the web app 502, can generate session IDs and can ensure license compliance. The application server 504 can be at least partially implemented with SvelteKit and NodeJS instances 508, but other tech stacks are also possible. The application server 504 can be connected to permanent storage to access licensing terms, workflow configurations, etc. The scan and/or document data may not handled by the application server 504. The messaging server 506 can coordinate communication between the mobile computing device and the personal computing device in a handover scenario such as the scenarios described with respect to FIGS. 2-4. The messaging server 506 may be implemented with socket.io and/or redis, but other tech stacks are also possible. Additionally or alternatively, the messaging server 506 can include in-memory and/or volatile storage without permanent record keeping.

In some examples, the computing environment 500 can facilitate integration of a website-within-a-website as an iframe in the integrator's page 510, such as a client website, and displayed as a pop-up. The communication between the main window and the iframe can be performed through native message API as well as the MessageChannel API. The MessageChannel API can allow messages to transit exclusively through two different browsing contexts. But to setup this channel, the postMessage API can be used first. To initialize the MessageChannel on both sides, (i) the iframe can be created, and "message" events coming from the iframe can be monitored, (ii) the "loaded" message coming from the iframe can be identified to be sure it's ready for the next step, (iii) once "loaded" has been received, a MessageChannel instance can be created, and a message including "message-channel-connection" with the port2 property in the transfer array can be sent, and (iv) the iframe can store port2 and can use it as the communication channel. After the above initialization, "message" events may not be used to further communicate. When using postMessage, the second parameter transferOrigin can be used to target messages. In some examples, when listening for "message" events, the sender's identity using the message source and origin properties can be verified.

In some examples, the application server 504 and the messaging server 506 may be included in the server system 304. The combination of the application server 504 and the messaging server 506 can provide functionality for the server system 304. That is, the combination of the application server 504 and the messaging server 506 can allow the server system 304 to perform operations disclosed herein such as providing a link to a device, providing decoding instructions to the device, storing decoded data only in volatile memory, facilitating encrypted communication between the device and a client website, and/or other suitable operations.

Figure 6:
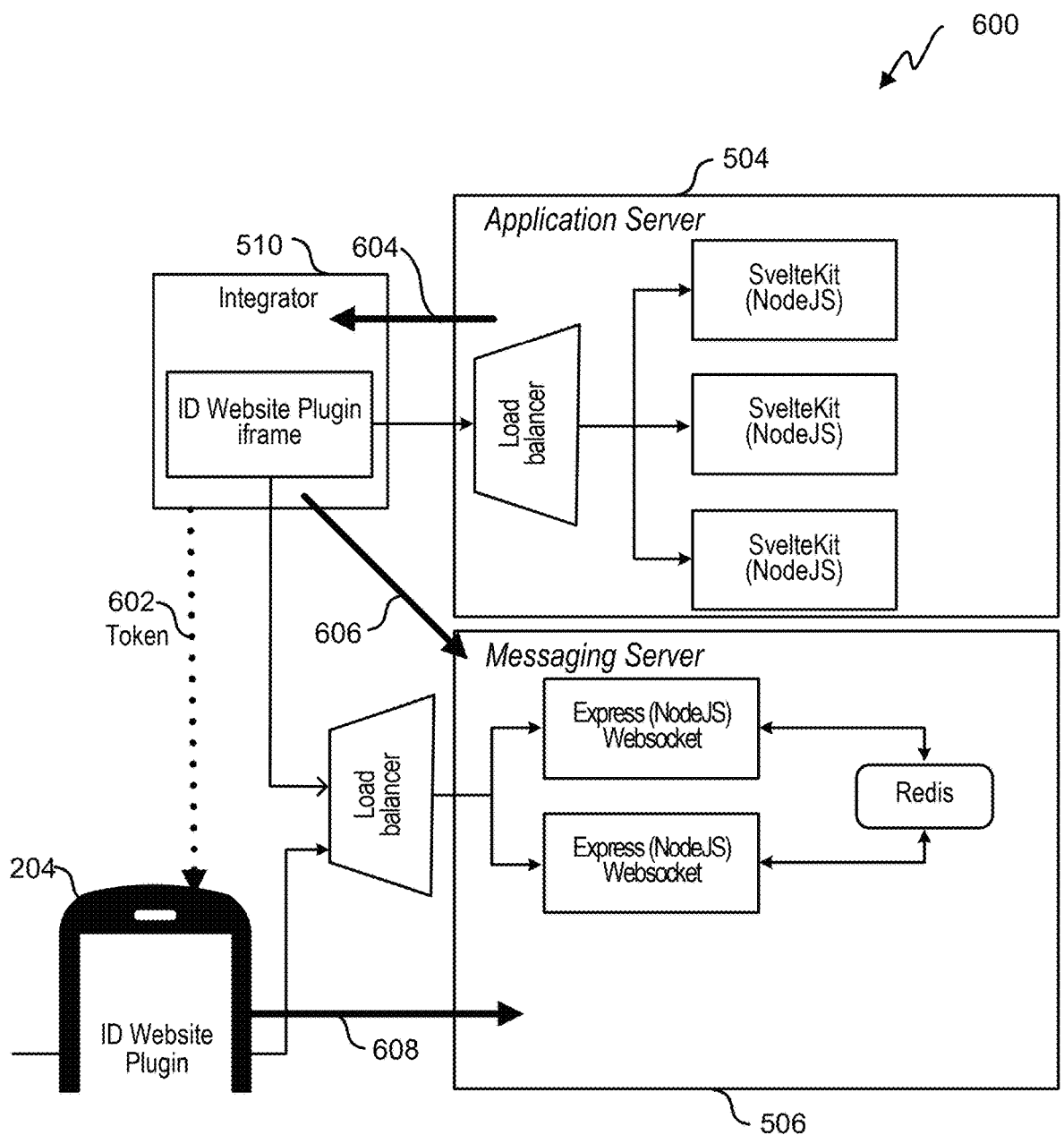
FIG. 6 depicts a computing environment that highlights security and data protection in a device handover scenario of secure ID scanning, in accordance with some embodiments.

FIG. 6 depicts a computing environment 600 that highlights security and data protection in a device handover scenario of secure ID scanning. In some examples, FIG. 6 illustrates security and data protection in the device handover scenario between the mobile computing device (scanner) and the personal computing device (integrated into client website) webapp. In some implementations, when running the whole process on a single device, security checks can be performed by the application server 504 to ensure the embedding website is authorized to use the application such as to ensure license compliance and to prevent misuse. A remote device, such as the second device 204, can connect to scan a document such as an ID document. But before doing that, the verification website can open a websocket channel on the messaging server 506. The messaging server 506 can facilitate connection using the current session ID and can create a "room" with the session ID. This allows a web frontend to monitor someone joining the same room and identify when a device has been paired. The session ID can be a UUID version 4 (RFC 4122) generated by the server (browser-generated UUID are not considered random secure). The randomUUID ( ) function can be used, and disableEntropyCache=true can be passed to disable caching.

To establish a websocket connection to the messaging server 506, a JSON Web Token (JWT) or CBOR Web Token (CWT) 602 (or other way to encode signed credentials) can be generated and sent along with the initial connection request. The JWT/CWT token 602 can include the session ID in the payload and can be signed by the application server 504 (See Table 1 below, which provides an example of the above).

TABLE 1

| // JWT data
{
// algorithm used
alg: "RS256";
// issuer
iss: "Scandit AG";
// audience
aud: "ID Website Plugin";
// expiration
exp: number;
// session ID
sessionId: string
// role
role: "main";
} |
|---|

In some implementations, the token 602 can have a TTL of 30 minutes. The token 602 can then be sent in the auth option of Socket.IO to the messaging server 506. The messaging server 506 can verify the JWT token 602 to confirm the token 602 was generated by the application server 504. Once the connection is established, the role is checked: only "main" is allowed to create a new room. The client can join the room corresponding to the session ID if the role is "main". The expiration can be stored in the websocket session. The socket can check every 30 seconds, or other suitable period of time, for expiration. If expired, the connection is closed and all clients are disconnected. There may be no refresh process, but clients can create a new connection with a new JWT token 602 if further processing is requested. The use of the token 602 ensures that the messaging server 506 can be used by authorized users without the messaging server 506 itself having to do this check against a customer database or configuration/credential database. The messaging server 506 can trust the token 602 since only the application server 504 can sign such tokens (only the applications server has the private key; the communication server 506 can verify this via the public key). This allows the messaging server 506 to run completely on volatile memory.

Once the connection is established, the connection is secure and messages can be exchanged. The WebSocket server may not validate the messages and may only pass the messages to clients connected to the room having the same session ID. As stated above, rooms have session data and store the expiration date. The rooms can check periodically for expiration. When expired, clients are disconnected and the room is destroyed (an empty room can be automatically destroyed by socket.io (socket.io doc page)).

A remote device, such as the second device 204, can connect using the QR code shown on the web application/verification website and that may be generated based on instructions from the server system 304. The QR code can include a JWT token 602 in a query parameter: "#URL encoded in the QR code: https://< ####-URL>/remote-connection?jwt=ea756d1 . . . " The goal of the token 602 may include avoiding undesirable random connections, as well as allowing the remote device to connect to the websocket server. The session ID is assumed to be random, secure, and unique, which makes the session ID able to authenticate connection. But the server handling this request may not have a list of active session IDs. The server may query the websocket server to know if there is a room using this session ID, which can create a dependency that may be undesirable. A JWT token 602 can easily be checked in-place by the server, which can then allow or disallow the connection. The JWT token 602 is also signed by the application server 504 and can include various data. An example of data included in the token 602 is produced below in Table 2.

TABLE 2

```
// JWT data
{
// algorithm used
alg: "RS256";
// issuer
iss: "Scandit AG";
// audience
aud: "ID Website Plugin";
// expiration
exp: number;
// session ID
sessionId: string;
// role
role: "client";
}
```

If the JWT token 602 is not valid or expired, the page can display an error (such as error status 401). Once the token 602 is successfully verified, the page can display the content to the user of the remote device to scan the document. To avoid session stealing or similar threats, no cookie is set to persist the legitimate state. The page can connect to the websocket server using the same JWT token 602 received in query parameters. In some examples, each remote device that connects can be assigned a unique ID to better log and track the connected devices (ticket). The role property allows the server system 304 to decide if the client is allowed to create a new room on the websocket server.

In some examples, and as illustrated in FIG. 6, the computing environment 600 may facilitate multiple authentications. For example, a first authentication 604 can be facilitated between the integrator (e.g., via the integrator website 510 or a backend server thereof) and the application server 504. Additionally or alternatively, a second authentication 606 can be facilitated between the integrator (e.g., via the integrator website 510 or a backend server thereof) and the messaging server 506. Additionally or alternatively, a third authentication 608 can be facilitated between the second device 204 and the messaging server 506. The authentications can be performed based on the token 602 and/or on other suitable security techniques.

Figure 7:
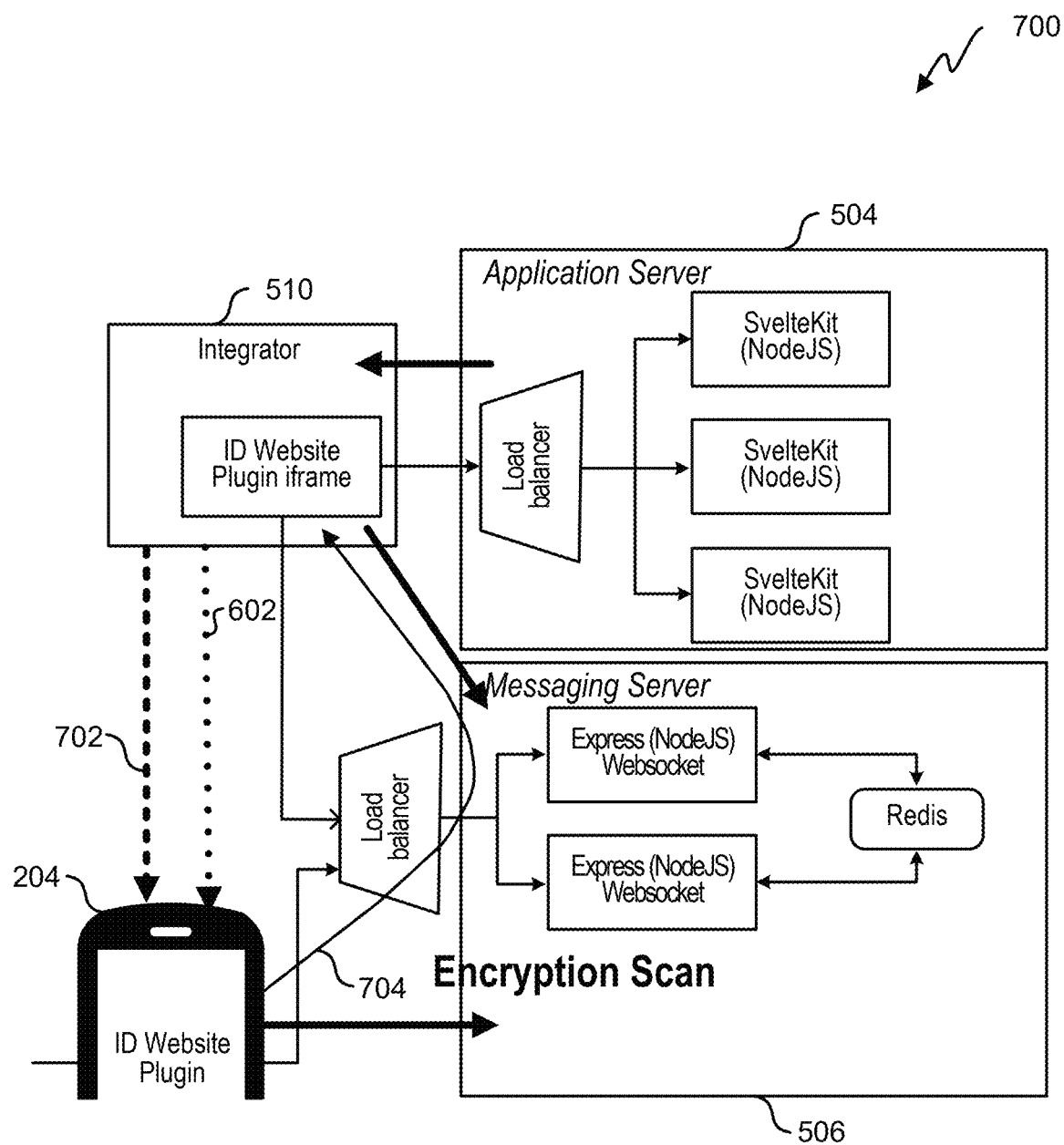
FIG. 7 depicts a computing environment 700 that highlights encryption features in a device handover scenario of secure ID scanning, in accordance with some embodiments.

FIG. 7 depicts a computing environment 700 that highlights encryption features in a device handover scenario of secure ID scanning. In some examples, FIG. 7 illustrates end-to-end encryption (E2EE) features of the device handover scenario. To ensure private communication between the personal computing device and the mobile computing device, the data can be encrypted in ways that the messaging server 506 cannot decrypt. For example, the server system 304, which may include the application server 504 and the messaging server 506 can allow the webapp to add its own public key to the server system 304 via one of two ways: (i) preventing the hosting provider (or an intruder in the hosting providers system) from accessing private data extracted from an ID document and/or (ii) using a public key and a private key.

The public key can be added to the QR code. Since the QR code is generated on the client side, the web app can generate a unique public/private key pair and can share the public key as part of the QR code to the mobile computing device. The web app running the scanner on the mobile computing device can extract the public key from the URL and use the public key to encrypt scan data before sending it back to the messaging server 506. Because the web app running on the desktop has the private key (it generated the pair of public+private keys), the messaging server 506 is not able to decrypt the scan data.

The public key can be shared via the private messaging room of the messaging server 506. Once the web app running on the personal computing device sees the mobile web app joining the websocket/messaging room, it can share the public key to the scanning mobile webapp. The scanning mobile webapp can extract the public key and use it to encrypt the scan data. As with the key in the QR code, the personal computing device web app has access to the private key for decrypting the scan data.

In some examples, and as illustrated in FIG. 7, the computing environment 700 may facilitate multiple encryptions. For example, a first encryption 702 can be facilitated for communications between the integrator (e.g., via the integrator website 510 or a backend server thereof) and the second device 204 such as the mobile computing device. The first encryption 702 can be for communications between the integrator website 510 and the second device 204 and/or for communications between the integrator backend server and the second device 204. In some examples, the first encryption 702 can be used to transmit decoded data extracted from a scan performed by the second device 204. Additionally or alternatively, a second encryption 704 can be facilitated for communications between the integrator (e.g., via the integrator website 510 or a backend server thereof) and the second device 204 with the messaging server 506 as a go-between. That is, communications originating with the integrator and/or the second device 204 that are routed through the messaging server 506 can be encrypted using the second encryption 704. In some examples, the messaging server 506 may not be able to decrypt the second encryption 704 or any other encryptions that may pass through the messaging server 506. The authentications can be performed based on the token 602 and/or on other suitable security techniques.

Figure 8:
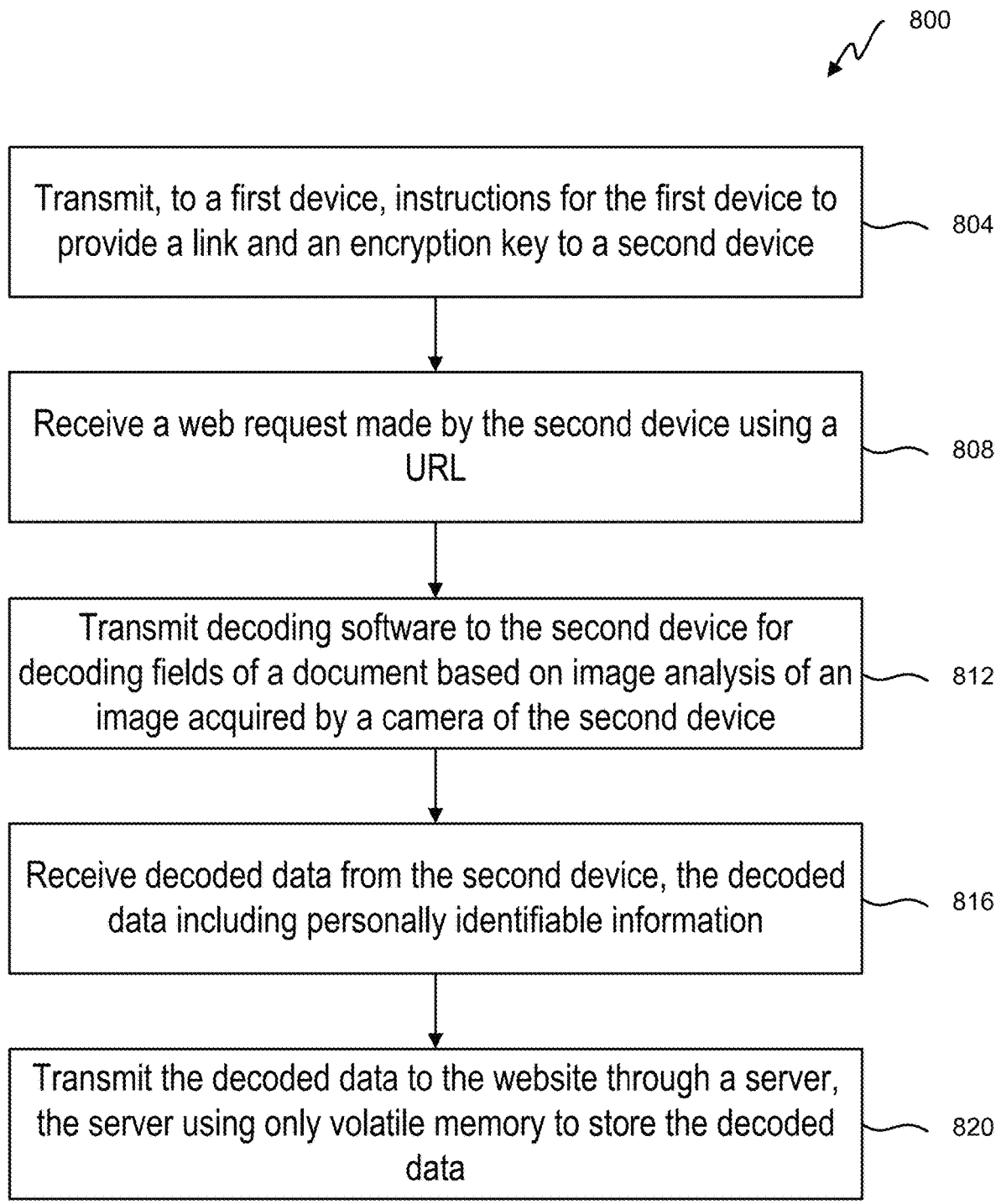
FIG. 8 depicts a flowchart of an embodiment of a process for secure ID scanning using image analysis, in accordance with some embodiments.

FIG. 8 depicts a flowchart of an embodiment of a process 800 for secure ID scanning using image analysis, in accordance with some embodiments. In some embodiments, the server system 304, or any component thereof, may perform the operations described with respect to process 800. At block 804, the server system 304 may transmit, to a first device, instructions for the first device to provide a link and an encryption key to a second device. The first device may be similar or identical to the first device 202 (e.g., a personal computing device), and the second device may be similar or identical to the second device 204 (e.g., a mobile computing device). The link may include a Uniform Resource Locator (URL) and a session ID that the first device has with a website of a service provider. Additionally or alternatively, the encryption key may be generated by the first device. In some examples, the link may be provided via an optical pattern such as a barcode or a QR code. The server system 304 may transmit the optical pattern to the first device for display via the first device. The optical pattern can be displayed via a UI on the first device in which the UI may be from a second website that is displayed within the website of the service provider. The second device can be used to execute the optical pattern. Executing the optical pattern can include scanning the optical pattern with a camera of the second device, selecting a link associated with the optical pattern, etc.

At block 808, the server system 304 receives a web request made by the second device using the URL. The second device may be used to initiate the web request. Initiating the web request may be performed by using the second device to execute the optical pattern or to otherwise attempt to navigate using the URL. By initiating the web request, the server system 304 may cause the camera of the second device to be activated to capture image data, for example relating to an ID document.

At block 812, the server system 304 transmits decoding software to the second device for decoding one or more fields of a document based on image analysis of an image acquired by a camera of the second device. The decoding software can include a computer vision model, a machine-learning or artificial intelligence model, or other suitable software that can be used to extract information based on image data. The second device may be used to capture image data such as by scanning an ID document using the camera of the second device. The ID document may include multiple potential fields that may indicate personal or otherwise private information. For example, the ID document may include a name field, an identification number field, and/or any other suitable fields. The decoding software may receive the image data and may identify the data from the multiple potential fields. The decoding software may extract the data and may encrypt the data for transmitting the data to a separate computing system or to other suitable locations such as the client website.

At block 816, the server system 304 receives decoded data from the second device. As discussed above, the decoded data may include personally identifiable information that may have been extracted from the image data by the decoding software. The decoded data may be encrypted using an encryption key that is unknown or otherwise non-decryptable by the server system 304. That is, the decoded data may be received by the server system 304, but the server system 304 may not be able to access or read the decoded data. In some examples, a session ID, public/private key encryption, and the like can be used to facilitate communication with the server system 304 without the server system 304 having access to the decoded data.

At block 820, the server system 304 transmits the decoded data to the website. In some examples, the server system 304 may only use volatile memory to store the decoded data. That is, once the server system 304 is done transmitting the decoded data, any portion of the decoded data stored at the server system 304, regardless of encryption status, may be deleted or otherwise overwritten. By using only volatile memory, the server system 304 can mitigate or eliminate risk of unintentional disclosure of the decoded data since the server system 304 does not retain the decoded data. The decoded data may be transmitted, such as in an encrypted form, to the website, which can decrypt the decoded data and use the decoded data to facilitate an interaction between the client (e.g., owner of the website) and a user of the second device.

Figure 9:
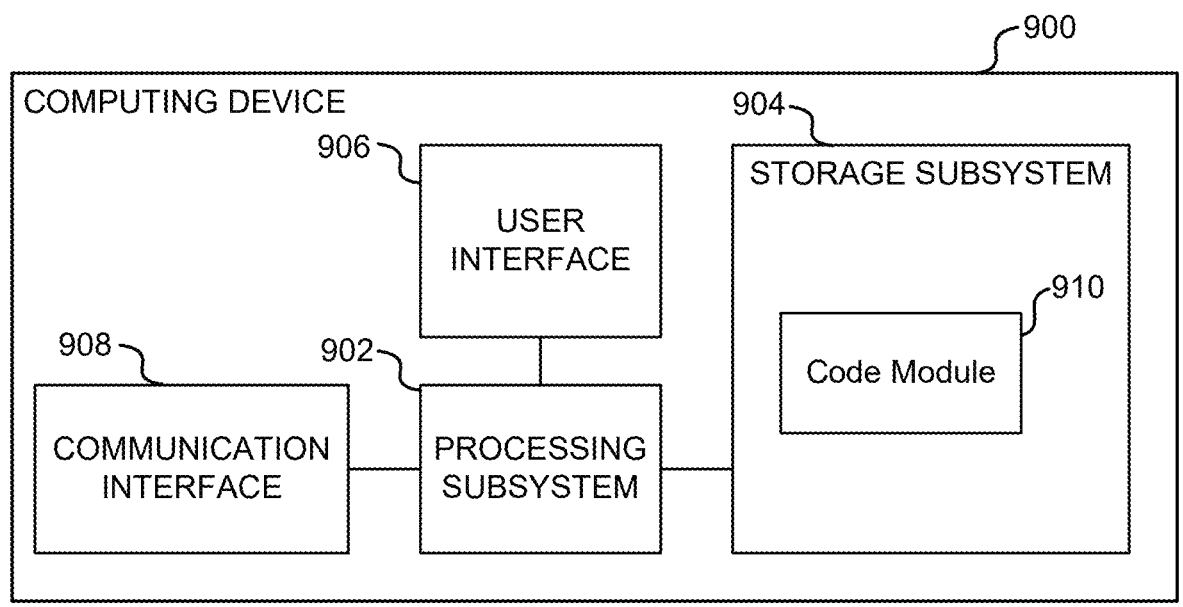
FIG. 9 depicts a block diagram of an embodiment of a computer system.

FIG. 9 is a simplified block diagram of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single-core or multi-core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

Communication interface 908 can provide voice and/or data communication capability for computing device 900. In some embodiments, communication interface 908 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for decoding an optical pattern using a digital camera comprising:
    a first device, wherein:
        the first device is a personal computer; and
        the personal computer is a laptop or desktop;
    a second device, wherein:
        the second device is a mobile device;
        the mobile device is a tablet or smartphone; and
        the second device comprises a camera; and
    one or more memory devices comprising instructions that, when executed by one or more processors, perform the following steps:
        transmitting, to the first device, instructions for the first device to provide a link and an encryption key to the second device, wherein:
            the link comprises a Uniform Resource Locator (URL);
            the link comprises a session ID that the first device has with a website of a service provider; and
            the encryption key is generated by the first device;
        receiving a web request made by the second device using the URL;
        transmitting decoding software to the second device for decoding one or more fields of a document based on image analysis of an image acquired by the camera of the second device;
        receiving decoded data from the second device, the decoded data comprising personally identifiable information; and
        transmitting the decoded data to the website through a server, wherein the server uses only volatile memory to store the decoded data.

2. The system of claim 1, wherein the link is providable via the second device as a QR code.

3. The system of claim 1, wherein the operations further comprise using the session ID to receive access permission to transmit the decoded data to the website.

4. The system of claim 1, wherein the server is a first server, wherein the system further comprises the first server and a second server, wherein the first server is configured to transmit the decoded data to the web service, and wherein the second server is configured to (i) provide the link via the second device and (ii) transmit decoding software to the first device.

5. The system of claim 1, wherein the operations further comprise establishing (i) a first connection between the system and the first device using the session ID and (ii) a second connection between the system and the second device using the session ID.

6. The system of claim 5, wherein the operation of transmitting the decoded data to the web service comprises retaining the first connection and the second connection while transmitting the decoded data to the web service.

7. The system of claim 1, wherein the operation of opening the website on the second device comprises:
    providing a graphical user interface to be displayed via the website, wherein the graphical user interface comprises a set of interactive features; and
    in response to receiving a selection of a first interactive feature of the set of interactive features, transmitting the decoding software to the second device, wherein the first interactive feature indicates use of the second device for scanning the identification document, and wherein a second interactive feature of the set of interactive features indicates use of the first device for scanning the identification document.

8. A method for decoding an optical pattern, the method comprising:
    transmitting, to a first device, instructions for the first device to provide a link and an encryption key to a second device, wherein:
        the link comprises a Uniform Resource Locator (URL);
        the link comprises a session ID that the first device has with a website of a service provider; and
        the encryption key is generated by the first device;
    receiving a web request made by the second device using the URL;
    transmitting decoding software to the second device for decoding one or more fields of a document based on image analysis of an image acquired by a camera of the second device;
    receiving decoded data from the second device, the decoded data comprising personally identifiable information; and
    transmitting the decoded data to the website through a server, wherein the server uses only volatile memory to store the decoded data.

9. The method of claim 8, wherein the link is provided via the second device and includes producing a QR code.

10. The method of claim 8, further comprising using the session ID to receive access permission to transmit the decoded data to the website.

11. The method of claim 8, wherein the method is performed by a first server, wherein the first server transmits the decoded data to the web service, and wherein a second server (i) provides the link via the second device and (ii) transmits decoding software to the first device.

12. The method of claim 8, further comprising establishing (i) a first connection between the system and the first device using the session ID and (ii) a second connection between the system and the second device using the session ID.

13. The method of claim 12, wherein transmitting the decoded data to the web service comprises retaining the first connection and the second connection while transmitting the decoded data to the web service.

14. The method of claim 8, wherein opening the website on the second device comprises:
providing a graphical user interface to be displayed via the website, wherein the graphical user interface comprises a set of interactive features; and
in response to receiving a selection of a first interactive feature of the set of interactive features, transmitting the decoding software to the second device, wherein the first interactive feature indicates use of the second device for scanning the identification document, and wherein a second interactive feature of the set of interactive features indicates use of the first device for scanning the identification document.

15. A memory device comprising instructions executable by a processor to cause the processor to perform operations comprising:
transmitting, to a first device, instructions for the first device to provide a link and an encryption key to a second device, wherein:
the link comprises a Uniform Resource Locator (URL);
the link comprises a session ID that the first device has with a website of a service provider; and
the encryption key is generated by the first device;
receiving a web request made by the second device using the URL;
transmitting decoding software to the second device for decoding one or more fields of a document based on image analysis of an image acquired by a camera of the second device;
receiving decoded data from the second device, the decoded data comprising personally identifiable information; and
transmitting the decoded data to the website through a server, wherein the server uses only volatile memory to store the decoded data.

16. The memory device of claim 15, wherein the operations further comprise using the session ID to receive access permission to transmit the decoded data to the website.

17. The memory device of claim 15, wherein the operations are performable by a first server, wherein the first server is configured to transmit the decoded data to the web service, and wherein a second server is communicatively coupled with the first server and is configured to (i) provide the link via the second device and (ii) transmit decoding software to the first device.

18. The memory device of claim 15, wherein the operations further comprise establishing (i) a first connection between the system and the first device using the session ID and (ii) a second connection between the system and the second device using the session ID.

19. The memory device of claim 18, wherein the operation of transmitting the decoded data to the web service comprises retaining the first connection and the second connection while transmitting the decoded data to the web service.

20. The memory device of claim 15, wherein the operation of opening the website on the second device comprises:
providing a graphical user interface to be displayed via the website, wherein the graphical user interface comprises a set of interactive features; and
in response to receiving a selection of a first interactive feature of the set of interactive features, transmitting the decoding software to the second device, wherein the first interactive feature indicates use of the second device for scanning the identification document, and wherein a second interactive feature of the set of interactive features indicates use of the first device for scanning the identification document.

* * * * *